FIG_1

INVENTOR
DON A. HAYNES
BY
Francis W. Anderson
ATTORNEY

July 29, 1969     D. A. HAYNES     3,458,013

MULTI-PURPOSE VEHICLE LIFT

Filed March 24, 1967     6 Sheets-Sheet 5

FIG_11

FIG_12

INVENTOR.
DON A. HAYNES

BY

*Francis W. Anderson*

ATTORNEY

United States Patent Office 3,458,013
Patented July 29, 1969

1

3,458,013
MULTI-PURPOSE VEHICLE LIFT
Don A. Haynes, Okemos, Mich., assignor to FMC Corporation, San Jose, Calif. a corporation of Delaware
Filed Mar. 24, 1967, Ser. No. 625,785
Int. Cl. B66f 7/08
U.S. Cl. 187—8.67                                    13 Claims

ABSTRACT OF THE DISCLOSURE

Laterally adjustable runways for supporting the front and rear wheels at each side of a vehicle are mounted upon a twin post hydraulic hoist. Each runway carries a turntable, jack and movable jack shelf for wheel alignment and suspension testing and correction procedures, and a wheel spinner for dynamic wheel balancing while the vehicle is supported on the runways. Air-operated support legs assume support of the runways at a convenient wheel alignment and balancing height, and the vehicle can be elevated to an overhead position for wheel suspension and other repairs or service procedures. The wheel spinners are retractable to permit the vehicle to be moved forwardly off the lowered runways in a diagnostic lane vehicle testing system. The runways are also adapted for use with existing twin-post hoists of various types to adapt them for wheel alignment and suspension testing and correction procedures in addition to their normal use.

BACKGROUND OF THE INVENTION

The general field of art to which the present invention pertains is vehicle hoists or lifts, both of the type used in wheel alignment testing and correction procedures, and of the type used for chassis service and the like with the vehicle elevated to an overhead position.

The prior art discloses vehicle lifts of the type used for lubrication, muffler service and allied purposes wherein the vehicle is elevated to an overhead position, such as in the lift disclosed in U.S. Patent 2,612,355. The prior art also discloses fixed or tiltable ramps of the type used in wheel alignment, testing and correction wherein the vehicle is maintained at a low elevation aligning it with associated wheel alignment testing apparatus and permitting only limited access to the suspension parts for adjustment or replacement, such as the ramp disclosed in U.S. Patent 2,962,980. Thus, each type of lift is limited to certain specific uses, some of which might be common to both types of lifts, but one type of lift cannot perform all the functions of the other type of lift. The present invention provides a vehicle lift which can efficiently perform all of the functions of both types of lifts, and which can adapt present twin-post vehicle lifts for use in wheel alignment operations.

SUMMARY

The present invention provides a multi-purpose vehicle lift facilitating various test and service functions formerly achieved by using two separate and distinct types of vehicle lifts. One general function necessitates an overhead service position for the vehicle, and the other general function requires a near-floor level testing position for the vehicle. Further, the vehicle lift has provisions for carrying out suspension testing, suspension repair and dynamic wheel balancing while the vehicle is on the lift, and will accommodate all cars and light trucks regardless of tread dimensions within a wide range of possible adjusted positions of the runways which support the wheels of the vehicle.

2

DESCRIPTION OF A PREFERRED EMBODIMENT

Figure 1:
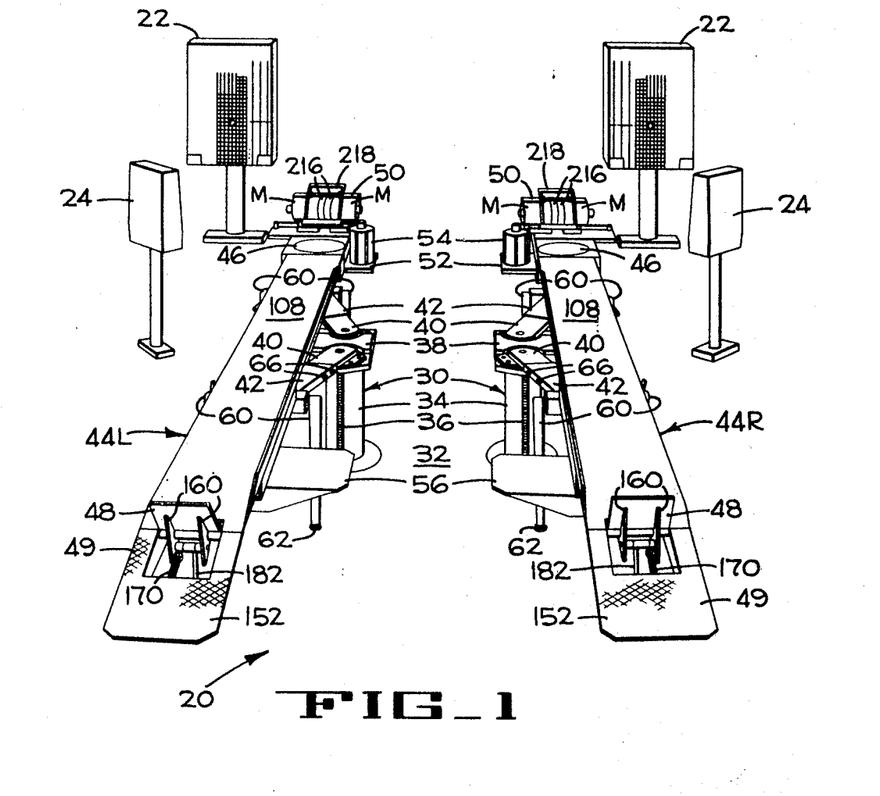
FIGURE 1 is a diagrammatic perspective showing the vehicle lift, in a partially elevated position suitable for aligning the wheels of a vehicle, and an optical wheel alignment apparatus.

With reference to FIGURE 1, the multi-purpose vehicle lift assembly 20 of the present invention has special utility at a testing station at which the wheel alignment characteristics of each front wheel of an automotive vehicle may be determined by testing apparatus including, for example, a chart and projector cabinet 22, and a relay mirror unit 24. The lift facilitates repairs or adjustments of the wheel suspension or any other chassis components because in its uppermost position the mechanic can stand under the vehicle. The lift assembly 20 is particularly adapted for use in a diagnostic lane system where vehicles are moved forwardly through a plurality of testing stations at which various components of the vehicle are tested and/or repaired, because of provisions in the lift whereby vehicles can be driven onto the lift assembly from one end, and driven off at the other end. Another important feature is that the vehicle supporting portions of the lift assembly 20 can be mounted on existing twin-post hoists of various types to adapt them for the additional service operation of wheel alignment testing and correction.

The vehicle lift assembly 20 includes a hydraulic hoist 30 which is mounted in a pit, not shown, beneath the floor surface 32 and has synchronously movable twin-posts or columns 34. One suitable hoist is a Model FS–27 hydraulic hoist manufactured by the Globe Hoist Company of Des Moines, Iowa, and disclosed in Patent No. 2,593,-630. The hoist includes a vertical rack 36 affixed to an upper head 38 of each post 34, the racks being engaged below the floor 32 by pinion gears on a common shaft so that the vertical movements of the posts are exactly the same.

Each post head 38 carries two arms 40 which in conventional service station types of hoists are freely pivotable and carry pads slidable along the arms 40 to engage the frame of the car. In the present instance, the arms 40 are fixed relative to their respective heads 38 and each carry a sleeve 42 which is fitted over the arm 40 and locked in place. The pairs of sleeves associated with each hoist post 34 are part of structure which supports a vehicle runway 44L or 44R. Both runways are of similar construction, except for obvious differences in orientation, and the present description is directed primarily to the right runway 44R, although it is equally applicable to the runway 44L.

By means of the later described runway support structure, either runway can be manually adjusted toward and away from its hoist post 34 so as to accommodate vehicles having different tread widths, or lateral interspacing of the wheels. The length of the runways 44L and 44R is sufficient to accommodate the wheel base or longitudinal interspacing of the wheels of most all passenger vehicles and light trucks, with each front wheel resting upon a conventional turntable 46. Each rear wheel is disposed forward of a wheel guard 48 which is mounted in an approach ramp 49 and is automatically erected when the runways 44L and 44R are raised from the floor 32 so as to prevent the vehicle from rolling rearward off the runways.

The forward end of each runway is normally blocked by a wheel spinner 50 which can be manually retracted from the path of the vehicle wheels if the lift assembly 20 is used in a diagnostic lane system in which the vehicles are successively tested at various stations along a given path. For that type of use, ramps 51 (FIGS. 2 and 3) may be secured to the forward ends of the runways. As shown in FIGURE 3, each ramp 51 can be locked into position beside its associated runway to serve as a step if access to the engine compartment of the vehicle is necessary, or for use as a tool shelf.

Laterally inward of each turntable 46, a fixed shelf 52 of the associated runway supports an air jack 54 which can be shifted on the shelf into jacking position beneath the wheel suspension of the vehicle in order to raise the wheel when the wheel spinner is used. Similar shelves 56 are mounted for longitudinally adjustable movement at the rearward end portion of each runway to support the same air jacks 54 when the rear wheels of the vehicle must be lifted from the runways. The shelves 56 can also be moved to the front of the runways and positioned adjacent the fixed shelves 52 to support the air jacks when it is necessary to use the frame of the vehicle as a lifting point to release load from the vehicle suspension so that the suspension can be checked for looseness and wear.

When in position to carry out a wheel alignment testing procedure, each runway 44L and 44R is supported from the floor 32 by two pairs of legs 60 which are pivotally connected to support means associated with the sleeves 42. Each leg 60 has a leveling pad 62 and the pads are adjusted upon installation of the lift assembly 20 to maintain the runways at the same elevation and precisely level when supported by the legs.

Specific structural features of the vehicle lift assembly 20, include lock mechanisms indicated at 64 which fix the runways in any laterally adjusted position, the mounting of the wheel spinners 50 for movement between wheel-contacting positions and retracted positions in which the runways are unobstructed, air-powered retracting mechanism for the runway support legs 60, and specific runway support structure which adapts a conventional twin-post frame hoist for use in wheel alignment procedures in addition to its normal chassis service use.

Figure 2:
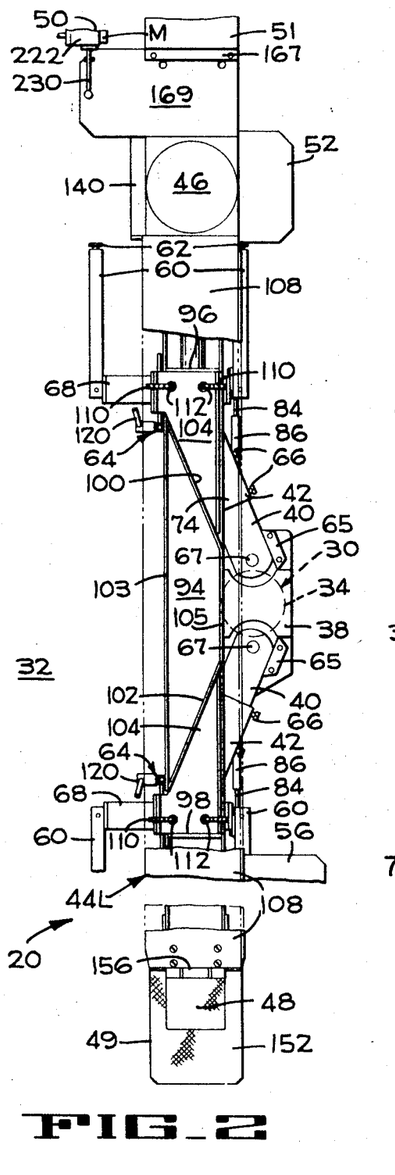
FIGURE 2 is a diagrammatic plan, partly broken away, of the left half of the lift shown in FIGURE 1, but in a different operational position.
Figure 3:
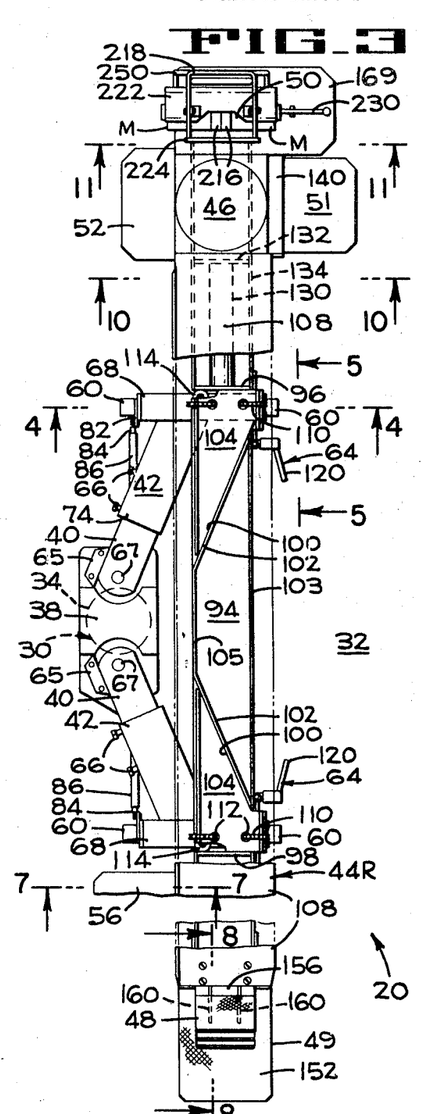
FIGURE 3 is a diagrammatic plan, partly broken away, of the right half of the lift shown in FIGURE 1 and in substantially the same operational position.

Before proceeding with a detailed structural description of the vehicle lift assembly 20, it should be noted that FIGURE 2 illustrates the left runway 44L in its innermost laterally adjusted position relative to the hoist arms 40, and that FIGURE 3 illustrates the runway 44R in its outermost laterally adjusted position. The runway legs 60 in FIGURE 2 are retracted and the lock mechanisms 64 are unlocked, while the same parts in FIGURE 3 are respectively erected and locked. As positioned in FIGURE 2, the runway 44L is resting close to the floor with the wheel guard 48 retracted for the positioning of the left side front and rear wheels of a vehicle on the runway. As positioned in FIGURE 3, the runway 44R is elevated for alignment and other test and correction procedures of the right side front and rear wheels of a vehicle, and the wheel guard 48 is erected so that the vehicle cannot roll rearward off the runway.

Figure 4:
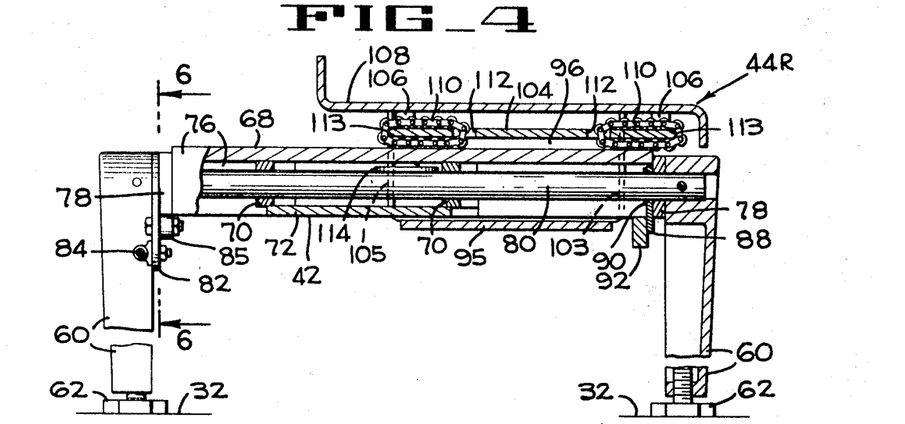
FIGURE 4 is an enlarged diagrammatic vertical section taken along lines 4—4 on FIGURE 3.

The sleeves 42 which are fitted over the hoist arms 40 are locked in place by bolts 66 and at their free ends rigidly support a lateral plate 68 that forms a support way or track for the associated runway 44L or 44R. Each hoist arm 40 is locked in predetermined angular relation to the hoist post head 38 by a block 65 which is secured to the head and prevents pivotal movement of the arm 40 about its pivot pin 67. As best shown in FIGURE 4, the sleeve 42 of the runway 44R has vertical side walls 70 which are diagonally disposed relative to the track 68 and extend under the track.

A bottom plate 72 and a top plate 74 (FIGS. 2 and 3) complete the sleeve 42 and enclose the hoist arm 40. The end surface of the arm 40 lies spaced from the track 68 and is thus not shown in FIGURE 4. The track 68 is part of an inverted U-shaped support arm weldment having side walls 76 (FIG. 5) and end walls 78. Walls 70 and 78 journal a rotatable pivot shaft 80, to the projecting end portions of which are pinned the support legs 60.

Figure 6:
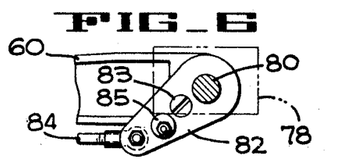
FIGURE 6 is a diagrammatic section taken along lines 6—6 on FIGURE 4, but illustrates a different operational position.

The inner support legs 60 each carry a crank arm 82, adjacent the wall 78, which is coupled to the piston rod 84 (FIGS. 2 and 3) of an air operated cylinder 86. The air cylinders are pivotally secured to the underside of the sleeves 42 and provide for power retraction of the support legs 60 to their FIGURE 2 positions when energized. As shown in FIGURE 6, each crank arm 82 is secured to the leg 60 by a machine screw 83 which is threaded into the leg, and each crank arm carries an eccentrically mounted stop 85 which abuts the end wall 78 at each limit of movement of the leg so that the powered legs, and the legs connected to the powered legs through the shafts 80, are either horizontal or vertical upon energization or deenergization, respectively, of the air cylinders 86.

An apertured stop member 88 (FIG. 4) is mounted on each pivot shaft 80 adjacent the outer legs 60 and is retained in abutting contact with the wall 78 by a spring steel washer 90 of the type having a sinuous profile so that the washer resiliently grips the shaft by deformation of its central aperture. When the runway 44R is in its outermost position illustrated in FIGURE 4, a clamp leg 92 of the lock mechanism 64 strikes the stop member 88 to limit outward travel of the runway.

The central substructure of the runway 44R (FIG. 3) includes a bottom plate 94 which extends between two lateral walls 96 and 98, and is reinforced by an elongate bar 95 (FIG. 4) which extends beyond the walls 96 and 98 to lend support to later mentioned runway substructure at each end of the runway. An inwardly divergent and open wedge-shaped pocket 100 (FIG. 3) is formed at each end portion of the bottom plate 94 by vertical diagonal walls 102, 102 that are secured to the bottom plate and merge with an outer wall 103 and an inner wall 105. Each pocket 100 receives the adjacent arm 40 and sleeve 42 when, as indicated in FIGURE 2, either runway is in its innermost position adjacent the hoist post 34. The walls 102 form stops to limit such movement.

Closing the upper end of each pocket 100 is a generally triangular plate 104 (FIG. 3) that forms an integral, rigid part of the runway substructure. Longitudinally extending spacer bars 106 (FIGS. 3 and 4) atop the plate 104 directly support an elongate tread plate 108 and provide clearance space beneath the tread plate for the upper flights of two roller chain loops 110. The spacer bars are interrupted in the area of the roller chain loops 110. The chain loops have rollers which are larger in diameter than the width of the links and extend through apertures 112 in the plate 104, across the upper and lower surfaces of the plate 104, and around rounded side edges 113 (FIG. 5) of the plate. The rollers on the lower flights of the chain loops are supported by the track 68 and support the triangular plates 104, thus mounting the runway for substantially frictionless lateral movement toward and away from the hoist post 34 between the limits of runway movement shown in FIGURES 2 and 3.

Endwise movement of the runway, such as might be caused by a vehicle braking or accelerating while supported on the runway, is limited in one direction by a roller 114 (FIGS. 4 and 5) which depends from the track 68 and rolls against the lateral wall 96. Another roller 114 (FIG. 3) depends from the other way plate 68 and rolls against the lateral wall 98 to prevent endwise movement of the runway in the other direction. It will be seen that the described mounting for the runway will permit a slight skewing action which is useful when the independent wheel suspension of a vehicle is brought to a neutral position before wheel alignment testing by jouncing the end of the vehicle to overcome any stiffness of the rubber bushings, shock absorbers and linkages of the suspension that tend to prevent the wheels from assuming a normal camber position.

Figure 5:
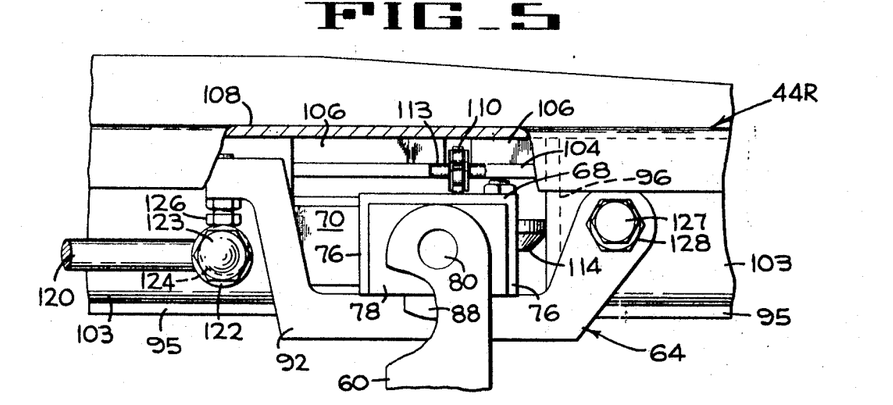
FIGURE 5 is an enlarged diagrammatic fragmentary elevation, partly broken away, of the area indicated by the arrows 5—5 on FIGURE 3.

Each runway lock mechanism 64 is actuated to prevent direct lateral movement of the runway by downward pivotal movement of a handle 120 (FIG. 5). The lock handle 120 is attached to a round shank 122 that is rotatable about a bolt, not shown, that projects outward from the wall 103 and is capped by an acorn nut 123. The inner end portion of the shank 122 is formed with an eccentric portion 124 lying in a vertical plane which includes the clamp leg 92 of the lock mechanism 64. Each end portion of the clamp leg 92 extends upward, one end carrying an adjustment bolt or follower 126 which rides upon the eccentric 124, and the other end being pivotally connected by a bolt 127 to the wall 103 (which is interrupted in the area of the track 68). The bolt 127 extends through an eccentrically bored, hexagon head adjustment sleeve 128 which by rotative positioning adjusts the upper horizontal edge of the clamp leg 92 to be substantially parallel to the lower edges of the side walls 76 (FIG. 4) of the track weldment 68 when the lock mechanism 64 is in a locking position.

This provides substantially total frictional engagement of the clamp leg 92 with the bottom edge surfaces of the walls 76, and prevents direct lateral movement of the runway in either direction. When the lock mechanisms are released, the previously mentioned skewing action is permitted.

The substructure of the runways beyond the lateral walls 96 and 98 (FIGS. 2 and 3) follows generally conventional design and includes a torque tube 130 extending forward of the wall 96 to a similar wall 132 to prevent twisting of a forward channel section 134 when the air jack reacts against its cantilevered platform 52. In order to support the turntable 46 at the same elevation as the tread plate 108, the channel section 134 is notched forwardly of the end of the tread plate 108, and an upwardly open U-shaped tray 140 (see also FIG. 10) is secured therein for supporting the turntable 46 at any desired position laterally of the runway tread plate 108. The fixed shelf 52 (FIG. 10) for the air jack 54 is hung from the tray 140 by bolts 142, and is secured to a fixed angle bar 144 by bolts 146, only one of each bolt being shown.

Figure 7:
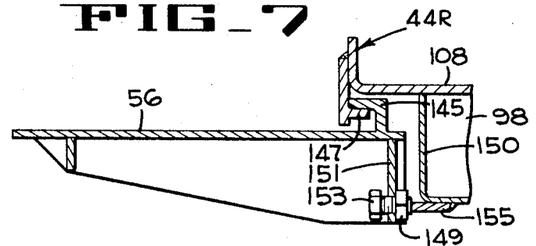
FIGURE 7 is a diagrammatic enlarged selection taken along lines 7—7 on FIGURE 3.

The rear shelves 56 (FIG. 7) have generally similar construction but are slidably mounted for movement longitudinally of the runway to accommodate vehicles having different wheel bases. The rear shelves 56 can be also be removed and relocated adjacent the fixed shelves 52 (FIGS. 2 and 3) to support the air jacks rearward of the front wheel suspension of the vehicle so that the front of the vehicle can be elevated by jacking against its frame.

In this way the suspension parts are unloaded and can be checked for looseness and wear. Since some front end repairs such as ball steering joint replacement require unloading the wheel suspension, the relocatable shelves 56 are important because front end repairs can be carried out while the vehicle is on the lift assembly 20.

The shelf 56 for the runway 44R (FIG. 7) is provided with an angle bar 145 that hooks over a fixed track 147, and has two spaced nuts 149, only one being shown, welded to a depending flange 151. Bolts 153 are threaded through the nuts 149 and bear against the outer edge of a fixed track 155 so that the shelf 56 can be levelled by endwise adjustment of the bolts, can freely slide along the runway 44R, and yet can readily be removed and remounted on similar support means, not shown, adjacent the rear edge of the shelf 52 at the front end of the runway.

Figure 10:
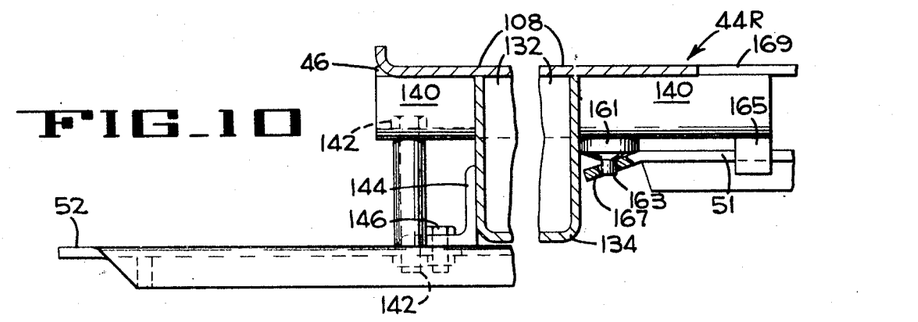
FIGURE 10 is an enlarged diagrammatic, fragmentary transverse section taken along lines 10—10 of FIGURE 3.

The previously mentioned ramps 51 (FIGS. 2 and 3) when used as steps, as indicated by the ramp 51 in FIGURE 3 for the runway 44R, are attached to the runway substructure in the manner shown in FIGURE 10. Thus, the underside of the U-shaped tray 140 is provided with depending frusto-conical spacers 161 with projecting pins 163, only one spacer and pin being shown, and the pins are arranged to project downward through apertures in the ramp 51. Outward of each spacer and pin an angle clip 165 depends from the tray 140 and has a horizontal leg which underlies the adjacent edge of the ramp 51.

The spacers 161 contact downwardly bent edge portions 167 of the ramps; when the ramps are installed at the end of the runways, as shown in FIGURE 2, the bent portions 167 lie flat upon wheel spinner support plates 169, and the other ramp portions decline toward the floor to provide transition surfaces permitting the vehicle to move forwardly off the runways when the runways are at floor level. The apertures which were formerly engaged by the pins 163 align with apertures in the wheel spinner support plates 169 and can receive bolts or headed pins to hold the ramps in alignment with the runways. As will be presently described, the wheel spinner 50 is retractably mounted on each support plate 169 and can be moved into driving relation with the adjacent wheel, as in FIGURE 3, or can be moved out of the path of the wheel as shown in FIGURE 2 to allow passage of the vehicle over the ramps 51.

The approach end of the runway 44R (FIGS. 7, 8 and 9) includes an upturned channel section 150 supporting the tread plate 108, and the ramp 49 is formed of an inclined tread plate 152 supported by wedge-shaped side plates 154 that are welded to the channel section 150. A pair of spaced hinge bosses 156 (FIG. 3) are bolted to the tread plate 108 and carry a hinge pin 158 which pivotally supports a pair of spaced hinge arms 160. The arms 160 carry the runway guard 48 between its FIGURE 9 retracted position in which the guard lies flush with the tread plate 152, and its FIGURE 8 position blocking rearward movement of a vehicle wheel.

Figure 8:
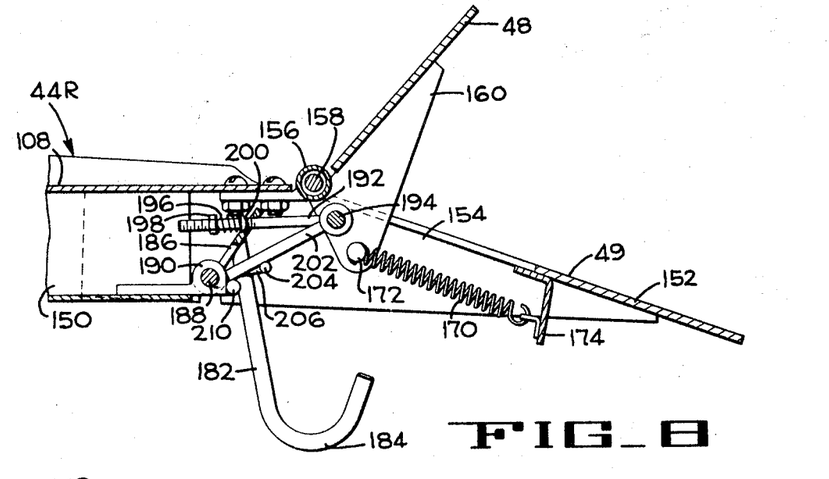
FIGURE 8 is an enlarged diagrammatic section taken along lines 8—8 on FIGURE 3.
Figure 9:
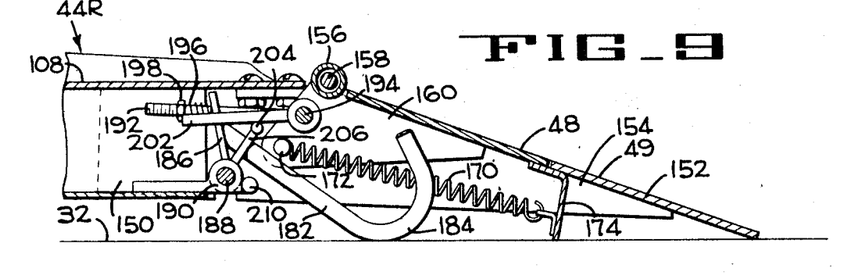
FIGURE 9 is a view similar to FIGURE 8, but with certain parts in a different operational position.

A tension spring 170 is connected between a pin 172 on one of the hinge arms 160 and to an angle bar 174 which provides a support ledge for the runway guard 48 in its FIGURE 9 position. The force of the spring 170 urges the runway guard toward its FIGURE 8 operative position when the guard is released from the control of a pivotally mounted actuating arm 182. The actuating arm has a curved, floor-engaging portion 184, and is welded to a plate 186 which in turn is connected to a rotatable pivot shaft 188. The pivot shaft extends through a hinge bracket 190 and a similar hinge bracket, concealed by the bracket illustrated, that is secured to the channel section 150.

When the runways are elevated from the floor 32, the plate 186 and the actuating arm 182 move toward their FIGURE 8 position clockwise about the axis of the pivot shaft 188. A release pin 192 is pivotally connected to a stub shaft 194 carried by one of the hinge arms 160, extends through an aperture in the plate 186, and carries a compression spring 196 between a nut 198 and a freely slidable washer 200. The release pin 192 is thus free to move toward the runway guard 48 when the actuating arm 186 pivots clockwise, and the spring 170 erects the runway guard.

Movable in a plane beside the plate 186 and the release pin 192, and pivoted to the stub shaft 194, is a runway locking pin 202 which is arranged to latch the runway guard 48 in its operative raised position. For this purpose, the locking pin 202 is gravity urged into contact with a lock control rod 204 that is mounted on a radial arm 206 of the pivot shaft 188, the arrangement being such that when the actuating arm 182 moves from its FIGURE 9 position toward its FIGURE 8 position, the free end portion of the locking pin 202 is lowered over the hinge bracket 190 onto a fixed ledge member 210 and the runway guard 48 cannot be retracted until the locking pin 202 is dislodged.

When the runway is lowered, the curved portion 184 of the actuating arm 182 contacts the floor surface 32 rearward of its pivot shaft 188, thus pivoting the arm 182 and the pivot shaft 188 counterclockwise. The lock control rod 204 thus lifts the locking pin 202 while the spring 196 is being compressed by the plate 186, and when the free end of the locking pin 202 clears the hinge bracket 190, the release pin 192 pulls the runway guard 48 to its FIGURE 9 retracted position.

Each wheel spinner 50 (FIGS. 2, 3 and 11) is of generally conventional construction in that is employs dual electric motors M which drive confronting tire engaging drums 216 whch rotate in the same direction for spinning the front wheel of the vehicle to carry out a dynamic balancing operation. After spinning the wheel, the operator presses downward upon the handle 218 of a brake unit which is pivoted at 220 to a motor shield 222, thus raising a friction pad 224 into engagement with the tire and rapidly bringing the wheel to rest.

Figure 11:
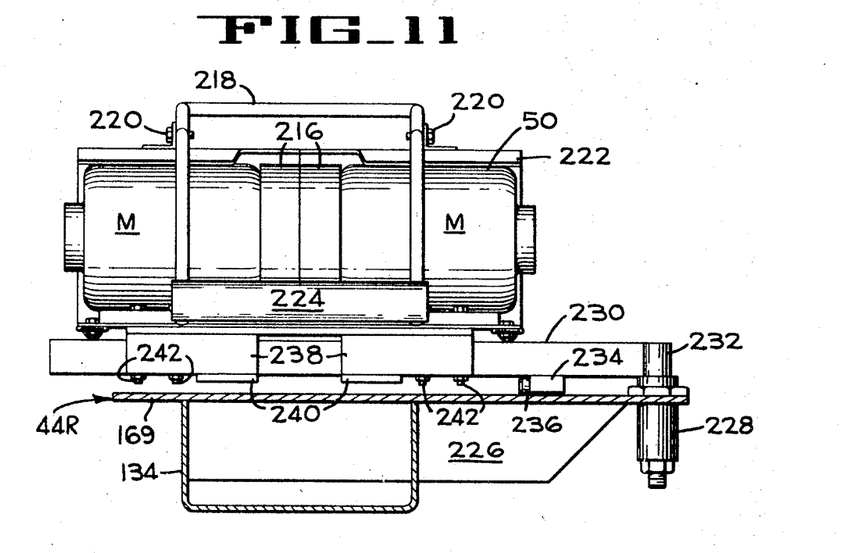
FIGURE 11 is an enlarged diagrammatic fragmentary transverse section taken along lines 11—11 on FIGURE 3.

Support for the wheel spinner 50 includes the support plate 169 which is reinforced by a central, lateral rib 226 and has a depending bearing sleeve 228. An elongate mounting bar 230 overlies the plate 169 and has an integral depending pivot pin 232 which is rotatable in the sleeve 228. A block 234 is secured to the lower edge of the mounting bar 230 and carries a roller 236 which rolls upon the plate 169.

Means for mounting the wheel spinner 50 upon the mounting bar 230 is provided by two slide members 238 which are of inverted U-shape and straddle the mounting bar 230. Retainer plates 240 interconnect the legs of the slide members to prevent vertical movement of the members off the mounting bar, but permit their sliding movement along the mounting bar. Bolts 242 extend tthrough each slide member to secure the wheel spinner 50. Since the wheel spinner is pivotable in a horizontal plane about the axis of the pivot pin 232 and can be adjusted longitudinally of the mounting bar 230, the wheel spinner drums 216 can be centered relative to an elevated wheel positioned over the turntable 46, and pushed against the wheel by pushing against a handle 250 (FIG. 3). By pulling on the handle to move the wheel spinner 50 away from the tire, the spinner can be retracted to the FIGURE 2 position in which forward movement of a vehicle over the ramps 51 is unobstructed. The described wheel spinner mount is designed so that the drums 216 are aligned with the median size tire of the overall range of tire sizes to be checked, so that the difference in rotational planes of the drums when engaged with smaller and larger size tires is minimized, and is rapidly adjustable into operating position with any size tire in a large range of sizes.

Air under pressure for operating the air jacks 54 (FIGS. 2 and 3) and the leg retracting air cylinders 86 is supplied to the lift assembly 20 and distributed to each runway by means not illustrated, but includes a flexible hose vertically depending from each runway in the vicinity of the hoist post 34 and extending below the floor into the pit which houses the hoist mechanism. The hose is in an elongate half-loop under the floor and carries a sheave supporting a suitable weight to automatically keep the hose taut when the hoist is lowered and raised.

Figure 12:
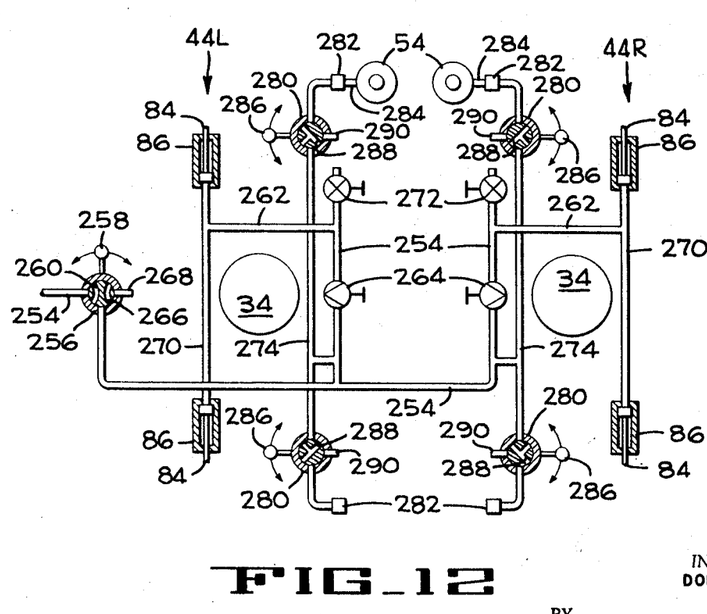
FIGURE 12 is a diagrammatic air control circuit for the overall vehicle lift excepting the hydraulic hoist.

In the diagrammatic air control circuit of FIGURE 12, air under pressure is delivered to a main supply conduit 254 that is controlled by a manually operable valve 256. Actuation of a control handle 258 to position a passage 260 in alignment with the conduit 254 supplies operating air pressure to a conduit 262 on each runway 44L and 44R through an associated flow control valve 264. The illustrated position of the handle 258 is a neutral position, and actuation of the handle to position a passage 266 in alignment with the conduits 254 bleeds exhaust air from the system to atmosphere through a conduit 268. It will be seen that the first described actuated position of the valve 256 will simultaneously energize the air cylinders 86 through conduits 270 to project their respective piston rods 84 and thus raise the runway support legs 60 (FIGS. 2 and 3) when the runways 44L and 44R are ready to be lowered onto the floor 32.

When the runways are in positions elevated above the elevation at which the lowered support legs will assume support of the runways, and assuming that the latter is in the desired position, the operator actuates valve 256 to bleed air from the lines leading to the cylinders 86 permitting the legs to lower. If it is desired to lower a support leg 60 to permit adjustment of mechanisms, such as the jack shelves 56, the operator opens a dump valve 272 on each runway which is connected near the junction of the conduits 262 and 254. This action releases exhaust air behind the pistons in the air cylinders 86 and bleeds off supply air faster than it can be supplied through the flow control valves 264, whereby the support legs 60 can assume the vertical, runway-supporting position and remain in this position until the valve 272 is closed.

A branch conduit 274 communicates with the high pressure air in conduit 254 and extends along each runway to the vicinity of the front air jack shelves 52 (FIGS. 2 and 3) and the rear air jack shelves 56. At each of these locations the conduit 274 is connected to a manually operable control valve 280. Each valve is connected to a quick plug-in type of air coupling 282 to which the supply hoses 284 for the air jacks 54 can be selectively coupled. The actuation of a control handle 286 will align passages 288 in the valve to either energize the jack with high pressure air, or to bleed exhaust air from the jack to atmosphere through a conduit 290.

From the preceding description, it will be seen that the vehicle lift 20 provides for multiple service and inspection functions, and which can convert existing vehicle hoists, of the type disclosed, for wheel alignment testing and repair procedures in addition to their conventional capabilities for handling chassis service and repair. The structural arrangement of the runway attachment to the hoist posts is important in that it provides for rapid and safe adjustment for vehicle tread width, and the air operated support legs enable quick positioning of a vehicle for wheel alignment testing, and quick repositioning of the vehicle for alignment tests following those repairs which are facilitated with the vehicle overhead. The structural relation of the runways with the wheel spinners 50 and with the air jack shelves 56 is also important since these elements have cooperative functions with the runways in either facilitating or adding to possible wheel testing and suspension repair operations which can be performed with any one conventional vehicle lift.

Figure 13:
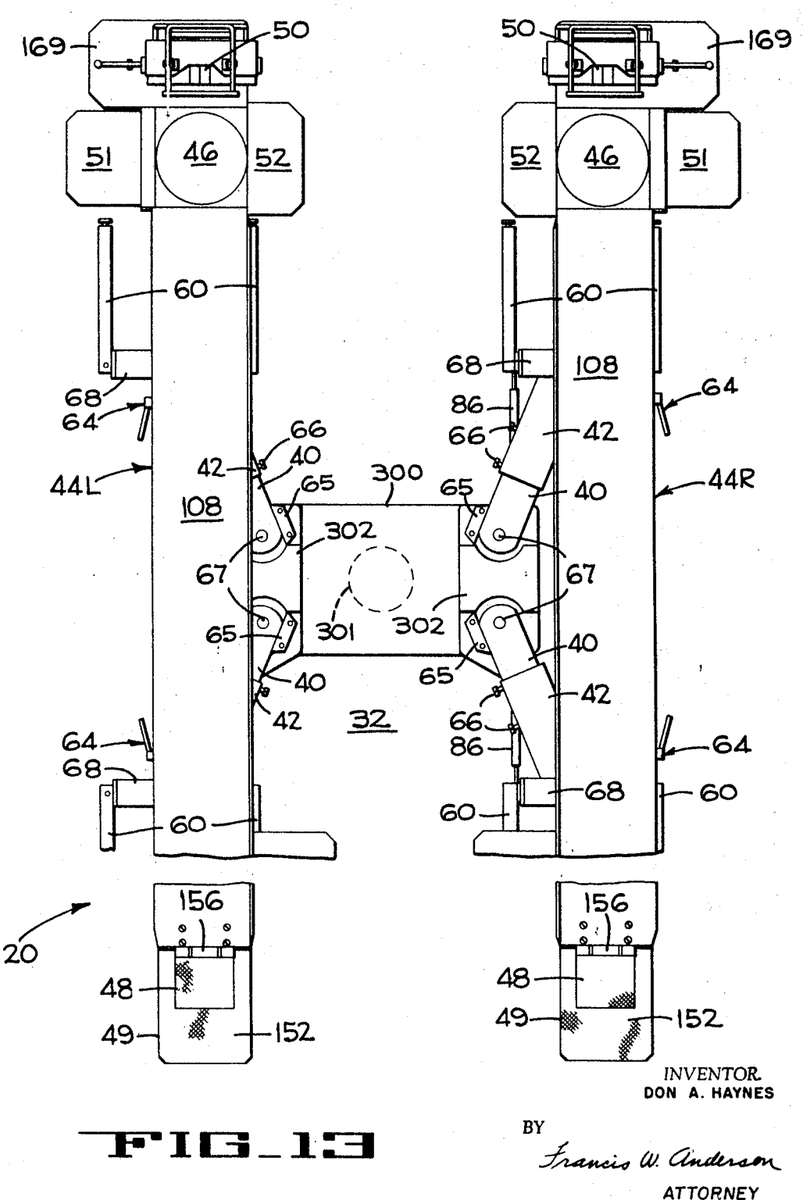
FIGURE 13 is a diagrammatic plan of a modified vehicle lift shown in its lowest position.

In FIG. 13 a modified lift is shown wherein only a single hoist is used. In this arrangement, a transverse beam 300 is secured to the top of a hydraulic hoist 301, of the same general type as the hoists 30 of FIG. 1. Plates 302, which are respectively identical to the previously described heads 38, are secured to the opposite ends of the beam 300. Each plate 302 supports a runway in the same manner as was described above in connection with the manner in which its counterpart post head 38 supports a runway. The parts of the lift of FIG. 13, that are identical to parts of the lift 20 shown in FIGS. 1–12 will be given reference numerals that are identical to the corresponding parts of lift 20.

Although the best mode contemplated for carrying out the present invention has been herein shown and described, it will be apparent that modification and variation may be made without departing from what is regarded to be the subject matter of the invention as set forth in the appended claims.

Having completed a detailed description of the invention so that those skilled in the art could practice the same, I claim:

1. A vehicle lift comprising a pair of upright hoist posts having upper end portions simultaneously and coextensively movable above ground level; an elongate runway tread plate adjacent the upper end of each post for supporting the front and rear wheels of a vehicle, means mounting each tread plate to its associated hoist post in substantially parallel relation to the other tread plate and for movement between an inner position adjacent said hoist post and an outer position remote from said post; said tread plate mounting means including a pair of support arms connected to each hoist post and cooperatively converging toward the other hoist post, a sleeve mounted on each support arm, a support track connected to each sleeve and extending transversely under the tread plate, and a fabricated runway support underlying the tread plate, said runway support defining outwardly open chambers confronting said support arms so that said support arms are nested within said runway support in the inner position of said runway.

2. Apparatus according to claim 1 in combination with a pivot shaft carried by and projecting from the ends of each of said support tracks, a leg secured to each end portion of said pivot shaft, a crank arm secured to the leg adjacent said sleeve, and a single acting air cylinder interconnecting said sleeve and said crank arm for simultaneous powered movement of the two legs mounted on the common pivot shaft.

3. Apparatus according to claim 2 in combination with means providing a source of air under pressure, a common air supply conduit interconnecting the inlet ports of said air cylinders, a flow control valve connected between said air source and said common conduit for controlling the flow of inlet air to said air cylinders, and a dump valve connected to said common conduit and operable to an open position to release exhaust air from said cylinders at a rate in excess of the rate at which air is supplied through said flow control valve.

4. In an automotive lift, a hoist mechanism including upright post means arranged for vertical movement above ground level, said post means including a pair of spaced upright hoist posts having portions arranged for simultaneous and coextensive vertical movement above ground level, a pair of spaced elongate runways supported on the upper ends, respectively, of said posts for cooperatively supporting the front and rear wheels of a vehicle, the interspacing of said support posts and said runways being sufficient to allow substantially unobstructed vertical access to the underside of a vehicle supported on said runways, attachment means mounting each runway to its associated hoist post in substantially parallel relation to the other runway, said attachment means providing for both lateral movement and for skewing movement of the runway relative to its supporting hoist post, and locking means carried away by each runway and cooperating with said attachment means for locking the runways in laterally adjusted position relative to said support posts.

5. The apparatus of claim 4 wherein each of said support posts includes an upper head and a pair of arms connected to said head and converging toward the opposite support post, a hollow sleeve mounted on each arm, a runway support track connected to said sleeve and extending transversely under said runway, anti-friction bearings carried by the runway and supported by said runway support tracks for transverse rolling movement of the runway along said support tracks, and a lock mechanism mounted on said runway adjacent each support track, each of said lock mechanisms when in locking position reacting against said support track to prevent transverse movement of the runway but accommodating skewing movement of the runway relative to the associated support track when said lock mechanisms are released.

6. The automotive lift of claim 5 wherein each of said lock mechanisms comprises a U-shaped locking bar cradling said support track, povot means connecting one end portion of said bar to said runway, a vertically adjustable follower carried by the other end portion of said locking bar, and a rotatable cam pivoted to said runway in abutting contact with the undersurface of said follower, said cam being rotatable between a locking position in which the base portion of said locking bar contacts said support track, and an unlocking position in which said base portion is spaced from said support track.

7. The apparatus of claim 4 including retractable legs connected to said runway attachment means to support the runways at a fixed elevation intermediate the extreme limits of vertical travel of the runways for testing a vehicle when the legs are extended.

8. In an automotive lift, a hoist mechanism including upright post means arranged for vertical movement above ground level, a pair of spaced elongate runways disposed in parallel relation on the upper end of said post means to receive a vehicle, said post means elevationally adjustable to position said runways between a floor supported position in which the vehicle can be driven onto said runways, to positions including one in which the vehicle wheels are at a convenient alignment testing height, and another in which the chassis of the vehicle is at a convenient service, inspection and repair height, an entrance ramp on each runway, and an exit ramp on each runway, said ramps providing transition surfaces between the floor and the runways in said floor supported position so that a vehicle can be moved to and from a runway-supported position by movement in only one direction, means mounting each runway for lateral movement and for movement in a horizontal plane to a skewed position, and means for locking each runway in its adjusted position.

9. The apparatus of claim 8 including movable legs selectively to support the runways at said alignment testing height.

10. In an automotive lift, a hoist mechanism including upright post means arranged for vertical movement above ground level, a pair of spaced elongate runways disposed in parallel relation on the upper end of said post means, means mounting each runway for lateral movement and for movement in a horizontal plane to a skewed position, means for locking each runway in its adjusted position, a wheel spinner carried by each runway, and means mounting each wheel spinner for lateral and longitudinal movement relative to its associated runway for positioning said wheel spinner to intercept and engage the front wheel of a vehicle driven forwardly onto and supported by said runways, said mounting means including means defining a pivot axis adjacent one longitudinal edge of said runway and providing for pivotal movement of the wheel spinner about said axis out of the path of the vehicle wheels along said runways.

11. The apparatus of claim 10 including supports pivotal between a retracted position and a support position selectively to support the runways at a fixed elevation intermediate the extreme limits of vertical movement of the runways.

12. In an automotive lift, a hoist mechanism including upright post means arranged for vertical movement above ground level, a pair of spaced elongate runways disposed in parallel relation on the upper end of said post means, means mounting each runway for lateral movement and for movement in a horizontal plane to a skewed position, means for locking each runway in its adjusted position, a wheel spinner carried by each runway, means mounting each wheel spinner for lateral and longitudinal movement relative to its associated runway for positioning said wheel spinner to intercept and engage the front wheel of a vehicle driven forwardly onto and supported by said runways, said mounting means including means defining a pivot axis adjacent one longitudinal edge of said runway and providing for pivotal movement of the wheel spinner about said axis out of the path of the vehicle wheels along said runways, each of said wheel spinner mounting means including a support plate underlying said wheel spinner and fixed to the associated runway, said support plate including said pivot axis defining means at a point laterally outward from said runway, an elongate wheel spinner support bar having one end portion pivotable about said pivot axis, a contact member depending from said support bar in movable engagement with said support plate, and a slide block connected to said wheel spinner and in slidable engagement with said support bar.

13. In an automotive lift, a hoist mechanism including upright post means arranged for vertical movement above ground level, a pair of spaced elongate runways disposed in parallel relation on the upper end of said post means, means mounting each runway for lateral movement and for movement in a horizontal plane to a skewed position, means for locking each runway in its adjusted position, two longitudinally spaced pairs of support legs pivotally connected to each runway mounting means in fore and aft straddling relation to said runway support post, an air cylinder coupled to each pair of support legs and carried by said runway mounting means, said air cylinders when energized raising the legs from a depending erect position to a position in which said legs are substantially parallel to the runways, an air control valve individual to each runway and connected to a common source of air under pressure, and conduits connecting each valve to its associated two air cylinders so that each valve in open position simultaneously powers both pairs of support legs.

References Cited

UNITED STATES PATENTS

| 2,124,726 | 7/1938 | Blum | 187—8.75 |
| 2,168,624 | 8/1939 | Musgrave | 187—8.67 |
| 2,456,646 | 12/1948 | Patterson | 187—8.49 |
| 2,721,628 | 10/1955 | Cheskin | 187—8.49 |

FOREIGN PATENTS

| 870,448 | 6/1961 | Great Britain. |

EVON C. BLUNK, Primary Examiner

HARVEY C. HORNSBY, Assistant Examiner

U.S. Cl. X.R.

33—203.12; 73—117